Jan. 10, 1939.                H. DIECKMANN                2,143,261
                            DUMB-WAITER REFLECTOR
                            Filed Nov. 17, 1937
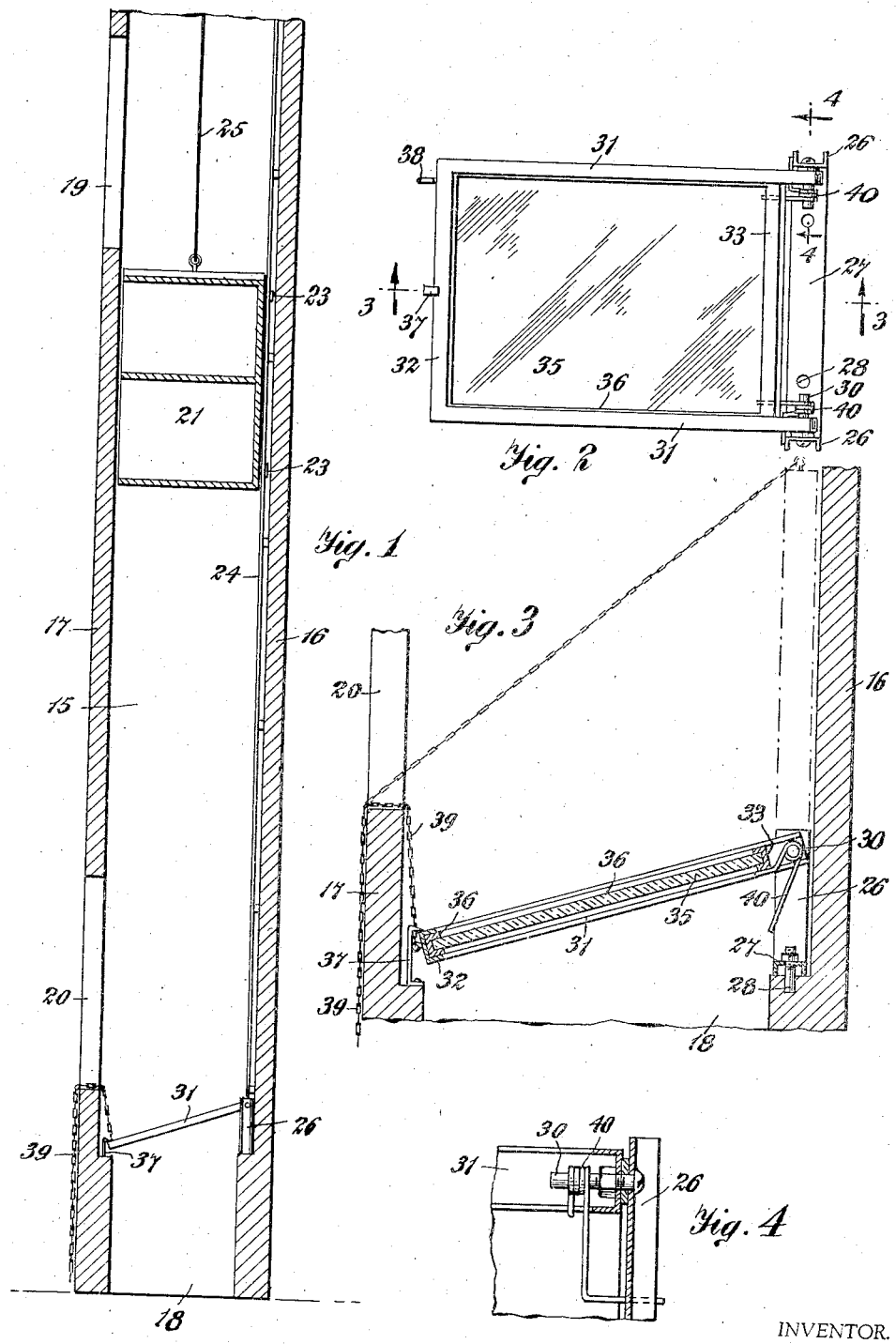
INVENTOR.
HENRY DIECKMANN
BY
ATTORNEY.

Patented Jan. 10, 1939

2,143,261

UNITED STATES PATENT OFFICE 2,143,261

DUMB-WAITER REFLECTOR

Henry Dieckmann, New York, N. Y.

Application November 17, 1937, Serial No. 174,993

1 Claim. (Cl. 187—3)

This invention relates to elevator shafts and more particularly to small hand operated elevators, of the enclosed type, as commonly installed in dwelling houses, apartments, flats, and the like, serving several floors in the building, and usually known as dumbwaiters.

Such devices are used in the delivery of foods, groceries, etc., and also in the disposal of debris and like accumulations.

Ordinarily the dumbwaiter shaft is located in the inner wall of the building, away from any light source, and each opening provided with a door or shutter, so that darkness prevails in its interior, rendering it difficult to ascertain the position of the car relative to an opening.

Having this matter in mind it is an object of the invention to provide a mirror, tiltingly mounted in the shaft or well, and so arranged as to disclose the position of the car, relative to an opening, by merely glancing downward.

A further feature is in the provision of means whereby the mirror, mounted below the shaft opening, is automatically moved out of the path of a car when ascending or descending, and at other times shows a clear view of the car when above the opening.

These meritorious objects are attained by the novel construction and arrangement of parts hereinafter described and shown in the accompanying drawing, constituting an essential component of this disclosure, and in which:—

Figure 1 is a partial longitudinal sectional view of a conventional type of dumbwaiter shaft, showing openings, a car and an embodiment of the invention therein.

Figure 2 is a top plan view of the mirror showing its attachment within the shaft.

Figure 3 is a sectional view taken on line 3—3 of Figure 2.

Figure 4 is a fragmentary sectional view taken on line 4—4 of Figure 2.

Referring in greater detail to the drawing, a conventional dumbwaiter shaft or well 15 is shown as having a rear wall 16, front wall 17 and side walls 18, the front wall being provided with openings 19—20, respectively upper and lower.

An open front car 21, having upper and lower compartments, is movable lengthwise within the shaft 15, being guided at its rear by inreaching hooks 23 engaging fixed upright rails 24, and is raised and lowered by a manually operable cable 25.

The improvement consists in attaching an open frame, consisting, as shown, of side channels 26 and a bottom channel 27, within the lower end portion of the shaft 15, below the lowermost opening 20.

This attachment may be fixed by bolts 28, set in the masonry, or in any other substantial manner.

Set rigidly in the upper ends of the channels 26 are bolts 30, their alined, inreaching ends acting as pivots to support a frame 31, having a cross bar 32 at the front and a connecting bar 33 near their rear ends.

A mirror 35, provided with a frame 36 is rigidly mounted in the outer frame 31, the rear ends of which are engaged by the pivots 30, in such manner as to permit the mirror to swing freely into various angular positions.

A spring clip 37, fixed in the front wall 17, maintains the mirror normally in position to show a reflection of the car, if above, so that an approximation of the distance away may be seen.

A screw eye 38, set in the front element 32 of the frame, has attached to it a chain 39, by which the mirror may be manually raised into the position indicated in broken lines in Figure 3.

The mirror is normally held as shown in Figure 2, against the spring hook clip 37, by reason of a pair of springs 40, encircling the pivots 30 and tending to thrust the mirror upwardly, but permitting it to move as indicated.

Although the foregoing is descriptive of the preferred embodiment of the invention, it will be apparent that minor changes may be made in its construction, without the exercise of invention or conflicting with the scope of the claim hereto appended.

Having thus described the invention, what is claimed as new and desired to secure by Letters Patent, is:—

In combination a dumbwaiter shaft having a car slidably mounted in said shaft, said shaft having openings in its front wall, a bracket fixed in the rear wall of said shaft below the lowermost opening, a frame pivoted in said bracket, a mirror fixed in said frame, a spring clip in the front wall of said shaft to engage said frame, springs urging said frame into engagement with said clip, and manually operable flexible means to raise said frame out of the path of said car.

HENRY DIECKMANN.